No. 665,100. Patented Jan. 1, 1901.
L. JOHNSON.
CASTRATING TOOL.
(Application filed Aug. 7, 1900.)
(No Model.)
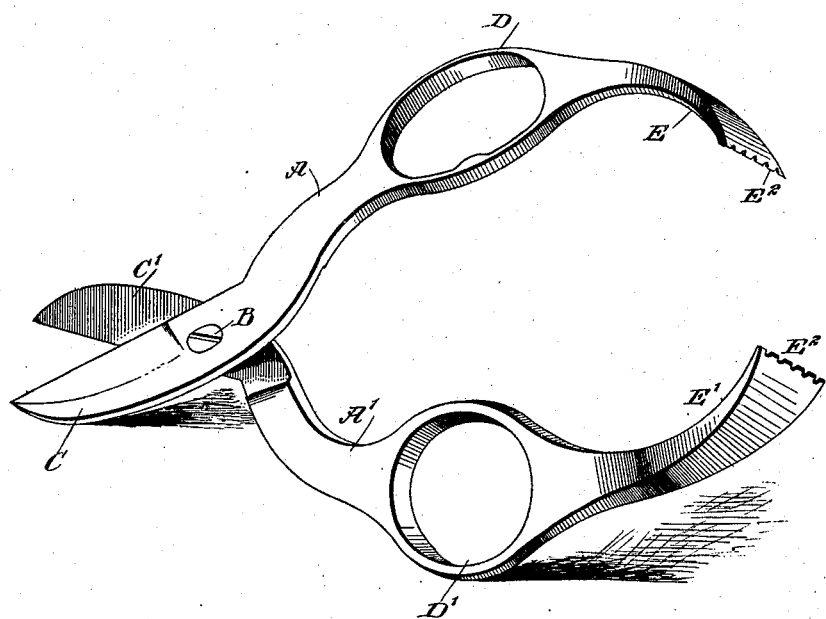
WITNESSES:
INVENTOR
Louis Johnson.
BY
ATTORNEYS

UNITED STATES PATENT OFFICE.

LOUIS JOHNSON, OF CULBERTSON, MONTANA.

CASTRATING-TOOL.

SPECIFICATION forming part of Letters Patent No. 665,100, dated January 1, 1901.

Application filed August 7, 1900. Serial No. 26,156. (No model.)

*To all whom it may concern:*

Be it known that I, LOUIS JOHNSON, a citizen of the United States, and a resident of Culbertson, in the county of Valley and State of Montana, have invented a new and Improved Castrating-Tool, of which the following is a full, clear, and exact description.

The object of the invention is to provide a new and improved castrating-tool which is simple and durable in construction, easily and conveniently manipulated, and more especially designed for use on lambs and other animals for docking the tails and ears and cutting off the end of the scrotum and removing the testicles.

The invention consists of novel features and parts and combinations of the same, as will be fully described hereinafter and then pointed out in the claim.

A practical embodiment of the invention is represented in the accompanying drawing, forming a part of this specification, in which the figure is a perspective view of the improvement.

The handles A and A' of the tool are pivotally connected with each other at one end by a pivot B, and said handles are extended beyond the pivot B to form the shear-blades C C', respectively, and said handles are also extended beyond their eyes D D' to form the jaws E E' of a pair of pincers. The transversely-extending edges E² of the pincer-jaws are preferably serrated, as indicated in the drawing, to insure a firm hold of the cord when pulling out the testicles. The shear-blades are in a closed position when the jaw edges E² meet, and hence said pincer-jaws E E' limit the closing movement of the shear-blades. The operator taking hold of the eyes D D' with one hand can readily move the handles toward and from each other to open and close the shears and pincers, and the operator without removing the tool from the hand can make use of either the shears or the pincers for docking the tails, for cutting off the scrotum, and for pulling out the testicles in a simple and convenient manner.

Having thus fully described my invention, I claim as new and desire to secure by Letters Patent—

A castrating-tool, comprising a pair of handles pivotally connected with each other near one end, shear-blades integral with the said handles and extending forward of the pivot, the other ends of said handles being curved and having integral pincer-jaws at their extremities, the opposing edges of said pincer-jaws extending at right angles to the shear-blades, and the said jaws limiting the closing movement of the blades, the said handles having a portion lying between the pincers and the pivot widened in a direction at right angles to the direction of the jaws of the pincers and provided in said intermediate widened portion with openings forming eyes, as set forth.

In testimony whereof I have signed my name to this specification in the presence of two subscribing witnesses.

LOUIS JOHNSON.

Witnesses:
M. H. CLARK,
HERMAN ALBRECHT.